United States Patent [19]
Hubbard

[11] 3,757,502
[45] Sept. 11, 1973

[54] COTTON HARVESTER
[75] Inventor: Arthur Lowell Hubbard, Des Moines, Iowa
[73] Assignee: Deere & Company, Moline, Ill.
[22] Filed: Mar. 11, 1971
[21] Appl. No.: 123,249

[52] U.S. Cl............................ 56/28, 56/2, 56/13.3, 56/30, 56/41, 56/97
[51] Int. Cl............................................. A01d 45/18
[58] Field of Search.................... 56/13.3, 28–50, 56/96–97

[56] References Cited
UNITED STATES PATENTS
3,651,624  3/1972  Bandemer.............................. 56/30
1,689,443  10/1928  MacGregor....................... 56/13.3 X
2,715,809  8/1955  Buell...................................... 56/28
2,765,612  10/1956  Raumaker et al. .................. 56/2 X
3,533,224  10/1970  Keck........................................56/28

Primary Examiner—Russell R. Kinsey
Assistant Examiner—J. A. Oliff
Attorney—H. Vincent Harsha, Harold M. Knoth, William A. Murray, John M. Nolan and Raymond L. Hollister

[57] ABSTRACT

A cotton harvester having a forward cotton harvesting mechanism that feeds cotton to a central fore-and-aft extending housing in which there is provided a rotatable horizontal transverse drum that has radially extending spindles that contact and retain cotton bolls on the plants as they pass through the housing.

14 Claims, 5 Drawing Figures

PATENTED SEP 11 1973 3,757,502

INVENTOR.
ARTHUR L. HUBBARD

BY William A. Murray

ATTORNEY

INVENTOR.
ARTHUR L. HUBBARD

BY William A. Murray

ATTORNEY

COTTON HARVESTER

BACKGROUND OF THE INVENTION

Conventionally, cotton plants have been grown in transversely-spaced rows and the harvesters utilized to move the bolls from the plants were spaced in accordance with the rows. However, with the improvement of seed, fertilizer and other crop improvement methods and ingredients, there has been considerable work done on providing plants that grow in rows closely spaced or in broadcast fashion. As a result, the conventional cotton harvester which utilizes large harvesting and conveying equipment between the rows is no longer practical. Therefore, it becomes necessary to provide a cotton harvester which will pick both narrow row cotton and/or cotton that is planted in broadcast fashion.

It has heretofore been known to harvest cotton by cutting the entire plant and feeding it into an area of the harvester in which the bolls are removed from the plant. Normally, bolls are removed by penetrating the plant with rotating spindles mounted on upright drums and having barbs thereon which snag the fibers of ripe cotton bolls and force their removal from their plants. The spindles are then moved out of the area of the plant where the cotton bolls are doffed from the spindles and are then collected. U.S. Pat. No. 3,533,224 which issued Oct. 13, 1970 to Keck shows a cotton harvester in which the entire plant is harvested and fed between spindle drums. However, the structure shown in this patent provides for the spindles to be mounted on upright drums and for the plants to be fed between adjacent upright drums.

It has also heretofore been known to provide cotton harvesters which utilize transverse horizontal picking drums that have radially extending spindles that reach into standing plants and snag onto the cotton bolls for purposes of removing the bolls from the plants. The bolls are then doffed from the spindles and again collected into the containers.

SUMMARY OF THE INVENTION

With the above in mind, it is the primary object of the present invention to provide a cotton harvester that removes bolls from standing plants that are either broadcast planted or planted in narrow rows. More specifically, it is the primary object of the present invention to provide a forward cutting mechanism that harvests or cuts the cotton plants and feeds the plants with the cotton bolls thereon centrally into a housing structure in which there is mounted fore-and-aft spaced-apart transverse horizontal spindle drums. The cotton plants are fed between the undersides of the drums and the floor of the fore-and-aft extending housing so that the spindles penetrate into the cut plants and operate not only to remove the bolls but also to remove the entire plants rearwardly through the housing. Rearward of the housing, there is provided a rear transverse auger that receives the plants after they leave the drums and conveys the plants outwardly of the housing. Each of the fore-and-aft spaced drums is provided with a horizontal doffing drum utilized to remove the bolls from the spindles of the respective drum. Positioned alongside each of the doffing drums and in boll-receiving relation thereto is a trough. A blower or air conveyor duct opens to one end of the trough and when air is provided in the duct, the cotton bolls are drawn out of the area of the doffer and upwardly into a basket or container.

It is also an object of the present invention to provide a horizontal spindle drum mounted in a housing which receives cotton plants with bolls attached thereto or which receives the individual bolls after they are removed from the plant. The bolls are wrapped around the rotating spindles in a manner previously described and through the action of the rotation of the drum, trash and other material is removed from the bolls. Cooperating with the spindle drum is a transverse housing plate which underlies the drum and has upwardly extending ribs penetrating between the spindles. This creates a further cleaning action and removes leaves and other plant debris from the bolls while at the same time the action of the spindles and bolls sweeps the trash rearwardly into a trash-removing conveyor at the rear of the housing.

DESCRIPTION OF THE PREFERRED EMBODIMENT

Figure 1:
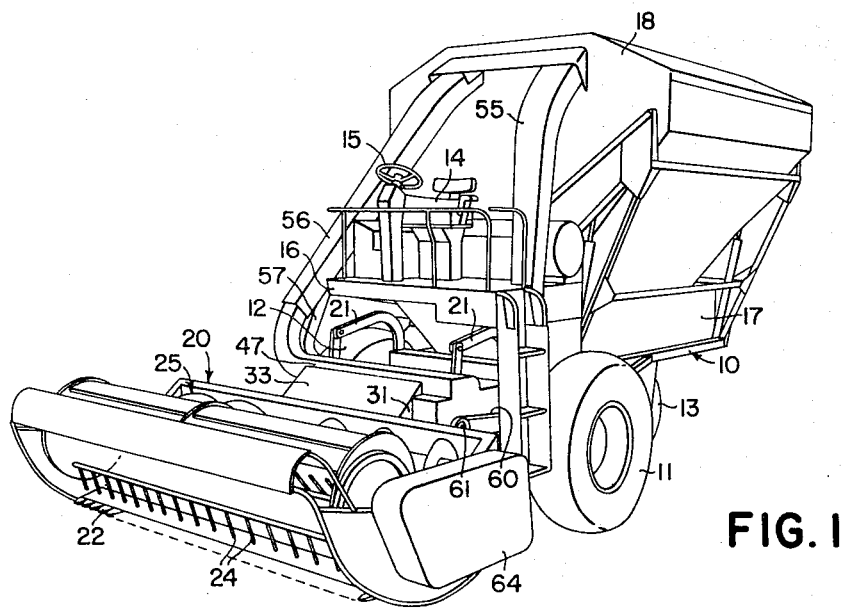
FIG. 1 is a front perspective view of a cotton harvester incorporating the structure of the present invention.

The harvester herein to be described is supported on a main mobile frame or tractor 10 having a front pair of transversely-spaced traction wheels 11, 12 and rear steerable wheels 13. Provided on the forward end of the frame or tractor 10 is an operator's station indicated by a seat 14 and a steering mechanism 15, both being located on an operator's platform 16. The frame or tractor 10 carries its own power source or engine 17 and an upper material-collecting agency or basket 18.

A harvesting mechanism, indicated in its entirety by the reference numeral 20, is positioned forwardly of the tractor 10 and is supported thereon by a pair of lift arms 21 which raise and lower the harvester 20 as required. The harvester 20 is composed of a forward plant-cutting mechanism that includes a front mower or shearing bar 22 extending across a wide expanse of plants. Cooperating with the shear bar 22 is an overhead reel 23 having radially extending teeth 24 that contact the plants as they move adjacent the shear bar 22 and feed them over the bar. As may be seen from viewing FIG. 2, the reel 23 and its teeth 24 sweep the harvested material in the form of cut cotton plants rearwardly into the forward side of a transverse conveyor 25. The conveyor 25 is composed of a single transverse structure having a pair of outer augers 26, 27 of opposite hand that transfers the plants inwardly to a central paddle structure 28.

Figure 2:
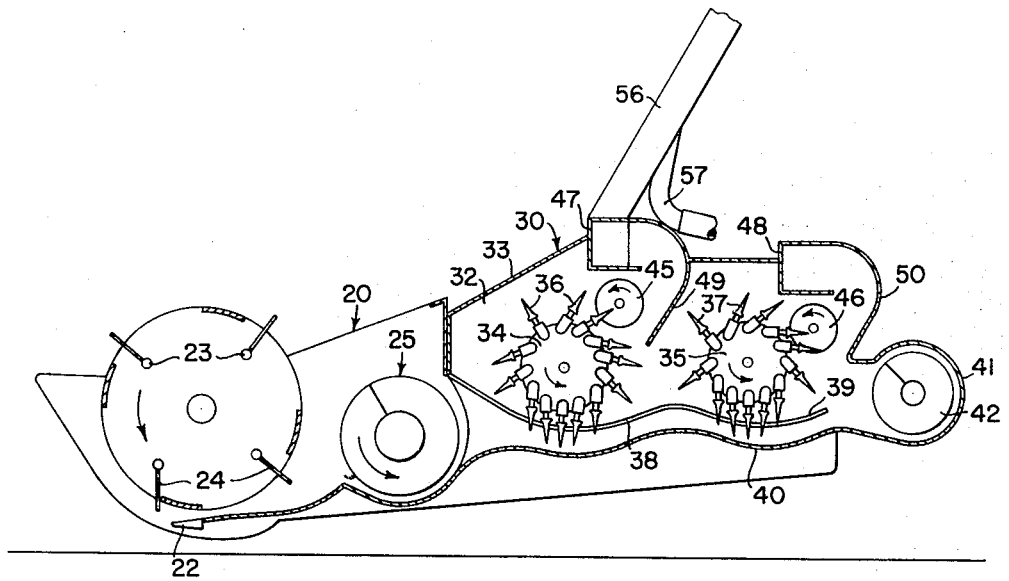
FIG. 2 is a vertical sectional view shown somewhat in schematic, of the harvesting mechanism as taken along the fore-and-aft centerline of the harvester.

A fore-and-aft extending housing 30, forming part of the framework for supporting the foward harvesting mechanism 20, is positioned on the fore-and-aft centerline of the tractor and is composed of left- and right-hand upright panels 31, 32 that are interconnected by a laterally disposed overhead panel 33. Supported within the housing and by the upright walls 31, 32 are front and rear boll-separating drums 34, 35 respectively. The drums 34, 35 may be of generally conventional nature, such as the type shown in U.S. Pat. No. 3,116,584 issued Jan. 7, 1964 to Arthur L. Hubbard, although the drums therein are vertical whereas the present drums 34, 35 are horizontal. However, details of the present drums, if desired, may be had by reference to that patent. The drums 34, 35 each have a series of transversely-spaced rows of vertically extending spindles 36, 37 respectively. The drums 34, 35 rotate in a manner in which the spindles move in vertical orbits, part of which are from front to rear on the underside of the respective drums. Arcuate-shaped grates 38, 39 are adjacent the underside of the drums and consist of a series of fore-and-aft extending and transversely spaced-apart bars through which the spindles 36, 37 penetrate. Disposed beneath the grates 38, 39 is a wave-shaped housing floor 40 having arcuate sections that follow closely in contour the orbital movement of the outer tips of the respective spindles 36, 37 on the undersides of the respective drums 34, 35. Referring to FIG. 2, plants being moved rearwardly by the paddles 28 into the open front end of the housing 30 are received on the underside of the front drum 34 between the grate 38 and the floor 40. The spindles moving from front to rear by the respective drums 34, 35 move or sweep the plants rearwardly in the channel formed on the upper side by the grates 38, 39 and on the underside by the floor 40. The spindles 36, 37 rotate about their own axis in the manner described in the aforesaid Hubbard U.S. Pat. No. 3,116,584 and snag onto the open cotton balls and detach the bolls from the plants as the plants are moved rearwardly. The plants are discharged rearwardly of the rear drum 35 into an auger housing 41 that extends transversely across the rear end of the housing 30. Contained within the housing 41 is an auger 42 that dispatches the plants outwardly to the left side of the housing 30.

Positioned rearwardly and above the respective cotton boll-separating drums 34, 35 are transverse horizontal doffing drums 45, 46 respectively. The drums 45, 46 are of conventional type and are composed of a series of vertical doffing plates spaced transversely on the order of the transverse spacings of the spindles 36, 37. The doffing plates engage cotton bolls snagged on the spindles 36, 37, remove the bolls, and dispatch them upwardly and rearwardly into a pair of transverse troughs or channels 47, 48. Arcuate-shaped panelling 49, 50 is positioned rearwardly of the respective drums 45, 46 and guides the bolls leaving the drum 45, 46 to the respective channels 47, 48. The channel 47 for the front drums 34, 45 opens outwardly to the right and the channel 48 for the rear drums 35, 46 opens outwardly to the left.

Air conveying means composed in part of a pair of vertical air ducts 55, 56 extend from the open end of the channels or troughs 48, 47 respectively upwardly and rearwardly into the forward upper portion of the basket 18. A blower, not shown, but supported on the tractor 10 forces air through ducts 57 into the ducts 55, 56 and directs the air upwardly through the ducts 55, 56. This creates an induced air flow through the troughs 47, 48 which draws the cotton bolls into ducts 55, 56.

Figure 3:
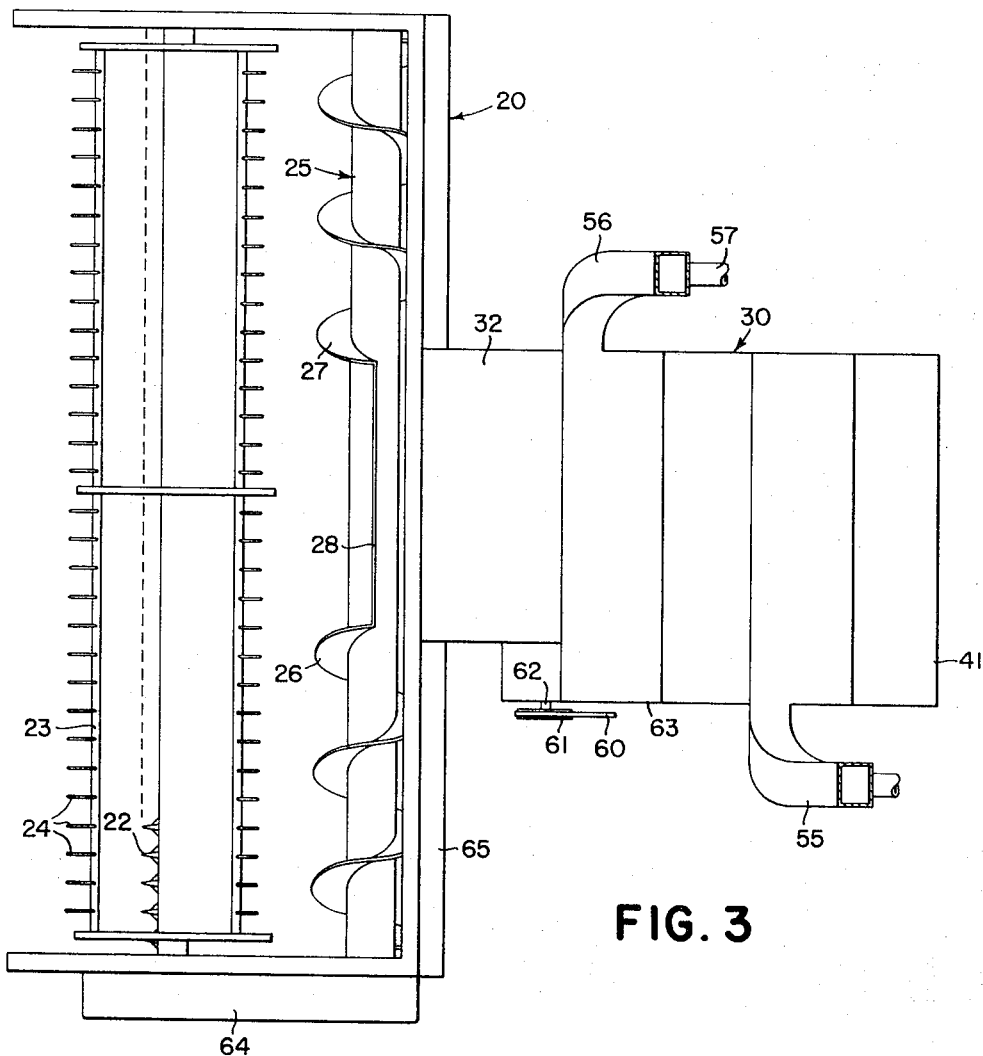
FIG. 3 is a plan view, also shown somewhat in schematic, of the harvesting portion of the harvester.

The boll-separating drums 34, 35 and the doffing drums 45, 46 are driven by a drive mechanism contained in a housing 63. The exact details of the drive mechanism serve no part of the present invention and it may be considered similar to that shown in U.S. Pat. No. 3,031,828 which issued May. 1, 1962 to Graham. In the latter patent, the drive for the spindle drums and doffing drums are shown for vertical drums. A similar drive, however, may be applied to the horizontal drum mechanism of the present invention, it being recognized that both spindle drums of the present invention rotate in the same direction thereby requiring a reversing gear mechanism that would distinguish it from drives of the latter patent. The auger 25, reel 23 and mower 22 are driven in a conventional manner by a drive mechanism, not shown, but contained in housing 64. A transverse drive shaft extends from the drive mechanism within the housing 63 to the drive mechanism contained in housing 64 and is covered by a transverse housing structure indicated at 65 in FIG. 3. The drives within the housings 64, 65 are of conventional nature, such having been on the market for several years and consequently serve no part per se of the present invention. The specific details of the drive, as mentioned, may be of any type as they have sufficient power to drive the rotating mechanisms and to drive the rotating mechanisms in the direction of the arrows shown in FIG. 2.

Figure 4:
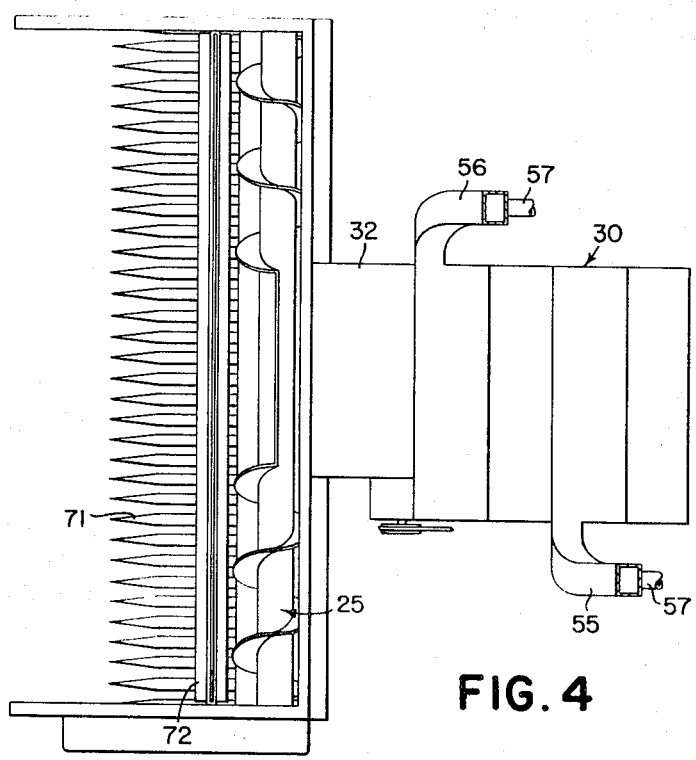
FIG. 4 is a view similar to FIG. 3 but showing a different type of cotton harvester.
Figure 5:
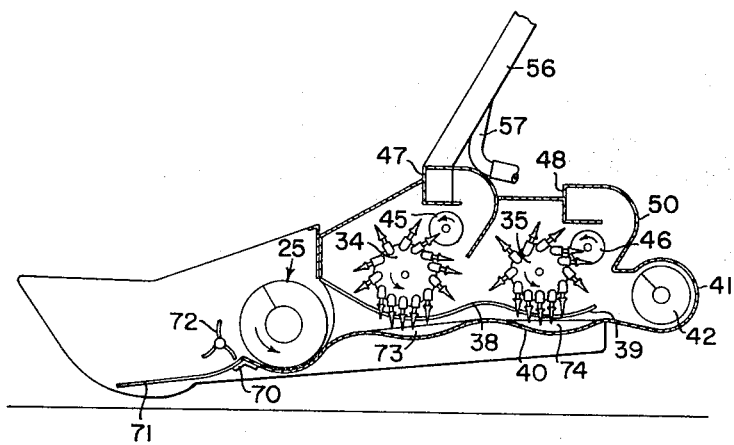
FIG. 5 is a view similar to FIG. 2 but showing the type of harvester set forth in FIG. 4.

Referring now to FIGS. 4 and 5 showing a modified form of the invention, there is provided forwardly of the housing 30 a harvester that does not detach the plants, but strips the cotton bolls from the standing plants. The harvester therein shown has a transverse auger structure 25 that receives cotton bolls and feeds them rearwardly to the forward open end of housing 30. A transverse beam 70 underlies the forward edge of the auger trough. Fixed to the beam is a series of transversely spaced-apart stripper bars 71. The stripper bars permit the plants to pass therebetween but are sufficiently close together so as to strip the bolls from the plants as the plants move through them. Positioned above the stripper bars 71 and just forwardly of the beam 70 is a small paddle wheel 72 that extends completely across the harvester and tends to sweep cotton bolls removed by the bars 71 rearwardly to the transverse auger structure 25.

The cotton bolls are moved inwardly by the auger structure 25 and then rearwardly through the open portion of the housing 30 to the underside of the forward spindle 34 and between the grate 38 and floor 40. From thence, the cotton bolls are moved to the rear spindle drum 35 and between the grate 39 and floor 40. Positioned on the floor 40 are upwardly projecting ribs 73, 74 that extend between the spindles as they move fore-and-aft through the underside of their orbits. The ribs 73, 74 operate in conjunction with the drums 34, 35 and their respective spindles to clean the cotton bolls by removing portions of the plants, dirt and other foreign matter that may have become entrained with the cotton. Thus, the spindle drums 34, 35 operate as cotton cleaners in this form of the invention.

I claim:

1. A cotton harvester comprising: a main mobile frame movable forwardly over a field of cotton plants; a plant harvesting mechanism supported forwardly of the frame for receiving and harvesting a transverse expanse of cotton plants as the frame moves forwardly; a fore-and-aft extending housing located centrally with respect to the harvesting mechanism; a transverse conveyor rearwardly of and in material-receiving relation to the harvesting mechanism for feeding material received from the mechanism centrally harvesting to the housing; a transverse horizontal spindle drum supported in the housing to rotate about a horizontal axis and having transversely-spaced vertical rows of rotating spindles movable in vertical orbits, in a part of which the spindles sweep from front to rear under the drum to contact and snag onto open cotton bolls to thereby remove the cotton bolls from the material as the material is swept rearwardly by the spindles; a rotating doffing mechanism supported by the housing above the spindle drum for removing cotton bolls from the spindles; and air conveyor means associated with and in material-receiving relation with the doffing mechanism for transferring the cotton bolls to a collecting agency.

2. The structure as set forth in claim 1 further characterized by a transverse conveyor supported on the housing opening forwardly in material-receiving relation to the underside of the rear drum and for receiving the plants from the rear drum and transferring them transversely and outwardly of the housing.

3. A cotton harvester comprising: a main mobile frame movable forwardly over a field of cotton plants; a plant-cutting mechanism supported forwardly of the frame for cutting a transverse swath of plants as the frame moves forwardly; a fore-and-aft extending housing located centrally with respect to the cutting mechanism; a transverse conveyor rearwardly of and in plant-receiving relation to the cutting mechanism for feeding cut plants centrally to the housing; front and rear transverse horizontal boll-separating drums supported in fore-and-aft spaced relation in the housing and about front and rear horizontal axes respectively, each of said drums having transversely-spaced vertical rows of vertically extending spindles movable in vertical orbits, in a part of which the spindles sweep from front to rear under the drum to contact the cut plants and snag onto open cotton bolls to thereby remove cotton bolls therefrom as the spindles sweep the plants rearwardly; a rotating doffing mechanism for each of said drums supported by the housing above the respective drums for removing cotton bolls from the spindles; and air conveyor means associated with and in material-receiving relation with the doffing mechanisms for transferring the bolls to a collecting agency.

4. The structure as set forth in claim 3 in which the air conveyor means includes a pair of troughs adjacent the respective doffing mechanisms for receiving cotton bolls therefrom and opening at their left- and right-hand ends respectively to respective vertical ducts, and said agency is a basket that receives cotton from the vertical ducts.

5. A cotton harvester comprising: a main mobile frame movable forwardly over a field of cotton plants; a plant-cutting mechanism supported forwardly of the frame for cutting a transverse expanse of plants as the frame moves forwardly; a fore-and-aft extending housing located centrally with respect to the cutting medium; means feeding cut plants centrally to the housing; a transverse horizontal boll-separating drum supported in the housing, said drum having transversely-spaced rows of extending spindles movable in vertical orbits in a part of which the spindles sweep from front to rear under the drum to contact the cut plants and snap onto open cotton bolls to thereby remove cotton bolls therefrom as the spindles sweep the plants rearwardly; a rotatable doffing drum supported by the housing for removing cotton bolls from the spindles; and air conveyor means associated with and in material-receiving relation with the doffing drum for transferring the bolls to a collecting agency.

6. The structure as set forth in claim 5 further characterized by a second boll-separating horizontal drum spaced rearwardly of the aforesaid drum and having transversely-spaced vertical rows of spindles movable in vertical orbits in which the spindles on the underside of the second drum move from front to rear and engage plants leaving the underside of the forward boll-separating drum.

7. The structure as set forth in claim 5 further characterized by a conveyor supported rearwardly of the boll-separating drum and in material-receiving relation to the plants leaving the latter drum following removal of the bolls.

8. The structure as set forth in claim 5 in which the doffing drum is positioned in the rear upper quadrant with respect to the drum rotation and the air conveyor means includes a transverse channel forward of the doffing drum and extending above the housing in material-receiving relation to the doffing drum.

9. The structure as set forth in claim 8 further characterized by panel means leading from alongside the doffing drum to the transverse channel for guiding bolls into the channel.

10. A cotton harvester comprising: a main mobile frame powered to move forwardly over a field of cotton plants; a fore-and-aft extending housing structure supported on the frame including a floor; a transverse horizontal boll-separating drum rotatably supported in the housing to rotate about a horizontal axis above the floor including a plurality of transversely-spaced vertical rows of spindles rotatable about their axes and rotatable with said drum to move the spindles in vertical orbits part of which includes a front-to-rear motion; a plant cut-off mechanism disposed forwardly of the housing and adapted to feed cut plants to the drum, the plants then to be moved rearwardly by the spindles in their front-to-rear motion while the spindles are snagging onto and removing ripe cotton bolls from the plants; and a horizontal rotating doffer supported by the housing adjacent the drum for removing cotton from the spindles.

11. The structure as set forth in claim 10 further characterized by a boll container on said frame, an air conveyor means including air duct means extending from a lower end adjacent the housing to an upper end exiting into the container and a horizontal trough structure extending transversely alongside and for receiving cotton bolls from the doffer and opening into the lower end of said air duct means, said air conveyor means including a blower device opening into the duct means and directing air toward said upper end.

12. The structure as set forth in claim 10 in which the front-to-rear portion is on the underside of the drum and said spindles when in said portion sweep the plants rearwardly over the floor.

13. The structure as set forth in claim 10 further characterized by a conveyor at the rear end of the housing receiving plants passing between from the drum and discharging them onto the ground.

14. The structure as set forth in claim 10 in which the plant cut-off mechanism is adapted to feed cut plants to the underside of the drum and between the drum and the floor of the housing, and the part of said orbits that includes a front-to-rear motion is on the underside of the drum.

* * * * *

UNITED STATES PATENT OFFICE
CERTIFICATE OF CORRECTION

Patent No. 3,757,502　　　　　　　　　Dated　11 September 1973

Inventor(s)　Arthur L. Hubbard

It is certified that error appears in the above-identified patent and that said Letters Patent are hereby corrected as shown below:

Column 5, line 3, before "mechanism" insert -- harvesting --;
same line, cancel "harvesting".

Signed and sealed this 25th day of December 1973.

(SEAL)
Attest:

EDWARD M. FLETCHER, JR.　　　　　RENE D. TEGTMEYER
Attesting Officer　　　　　　　　Acting Commissioner of Patents